United States Patent
Faccin et al.

(10) Patent No.: US 10,666,605 B2
(45) Date of Patent: *May 26, 2020

(54) DYNAMIC SECURITY GATEWAY SELECTION

(71) Applicant: QUALCOMM Incorporated, San Diego, CA (US)

(72) Inventors: Stefano Faccin, San Ysidro, CA (US); Suli Zhao, San Diego, CA (US); Amer Catovic, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,322

(22) Filed: Nov. 6, 2018

(65) Prior Publication Data

US 2019/0075076 A1 Mar. 7, 2019

Related U.S. Application Data

(63) Continuation of application No. 15/887,682, filed on Feb. 2, 2018, now Pat. No. 10,158,601, which is a
(Continued)

(51) Int. Cl.
*H04L 29/12* (2006.01)
*H04W 76/10* (2018.01)
(Continued)

(52) U.S. Cl.
CPC ...... *H04L 61/1511* (2013.01); *H04L 61/2007* (2013.01); *H04L 61/305* (2013.01);
(Continued)

(58) Field of Classification Search
None
See application file for complete search history.

(56) References Cited

U.S. PATENT DOCUMENTS

| 9,900,282 B2* | 2/2018 | Faccin | H04W 4/90 |
| 10,158,601 B2* | 12/2018 | Faccin | H04W 4/90 |

(Continued)

FOREIGN PATENT DOCUMENTS

WO 2012142889 A1 10/2012

OTHER PUBLICATIONS

"3rd Generation Partnership Project; Technical Specification Group Core Network and Terminals; Access to the 3GPP Evolved Packet Core (EPC) via non-3GPP access networks; Stage 3 (Release 13)," 3GPP Standard; 3GPP TS 24.302, 3rd Generation Partnership Project (3GPP), Mobile Competence Centre ; 650, Route Des Lucioles ; F-06921 Sophia-Antipolis Cedex ; France, vol. CT WG1, No. V13.1.0, Mar. 19, 2015 (Mar. 19, 2015), pp. 1-104, XP050927788, [retrieved on Mar. 19, 2015] sections 4.4.3, 5.3.2, 7.1 and 7.2.1.
(Continued)

*Primary Examiner* — Kouroush Mohebbi
(74) *Attorney, Agent, or Firm* — Arent Fox LLP

(57) ABSTRACT

In aspects of the disclosure, a method, an apparatus, and a computer program product for wireless communication are provided. In one aspect, the apparatus determines if a connection to a PLMN has been established. In another aspect, the apparatus builds a FQDN based on the determination by attempting to build the FQDN using each of the prioritized FQDNs in order of priority until the FQDN is built, building the FQDN using a PLMN ID of the PLMN if it is determined that the PLMN is found in the list, or building the FQDN based on the wildcard PLMN if it is determined that the list comprises the wildcard PLMN. Further still, the apparatus selects a network security gateway to provide network security and internet working control based on the FQDN.

34 Claims, 11 Drawing Sheets

Related U.S. Application Data continuation of application No. 14/969,612, filed on Dec. 15, 2015, now Pat. No. 9,900,282.

(60) Provisional application No. 62/160,572, filed on May 12, 2015.

(51) Int. Cl.
    *H04W 4/90*     (2018.01)
    *H04W 48/00*    (2009.01)
    *H04W 88/16*    (2009.01)
    *H04W 84/04*    (2009.01)

(52) U.S. Cl.
    CPC ............ *H04W 4/90* (2018.02); *H04W 48/17* (2013.01); *H04W 76/10* (2018.02); *H04W 88/16* (2013.01); *H04L 61/304* (2013.01); *H04L 61/3045* (2013.01); *H04W 84/042* (2013.01)

(56) References Cited

U.S. PATENT DOCUMENTS

| | | | |
|---|---|---|---|
| 2010/0054222 A1* | 3/2010 | Rune | H04L 29/12066 370/338 |
| 2011/0096750 A1 | 4/2011 | Velandy et al. | |
| 2014/0153559 A1 | 6/2014 | Roeland et al. | |
| 2014/0241333 A1 | 8/2014 | Kim et al. | |
| 2018/0159816 A1 | 6/2018 | Faccin et al. | |

OTHER PUBLICATIONS

"3rd Generation Partnership Project; Technical Specification Group Core Network and Terminals; Numbering, addressing and identification (Release 13)11," 3GPP Standard; 3GPP TS 23.003, 3rd Generation Partnership Project (3GPP), Mobile Competence Centre ; 650, Route Des Lucioles ; F-06921 Sophia-Antipolis Cedex ; France, vol. CT WG4, No. V13.1.0, Mar. 12, 2015 (Mar. 12, 2015), pp. 1-92, XP050927705, [retrieved on Mar. 12, 2015].

Alcatel-Lucent., "Selection of ePDG based on home operator preference," C1-151175, Version 13.1.0, 3GPP TSG-CT WG1 Meeting #91, Bratislava (Slovakia), Apr. 13-17, 2015, 4 Pages.

International Search Report and Written Opinion—PCT/US2016/020121—ISA/EPO—dated May 17, 2016.

SA2 : "Clarification of ePDG Selection Function," 3GPP Draft; S2-150821 Clarification of EPDG Selection Function, 3rd Generation Partnership Project (3GPP), Mobile Competence Centre ; 650, Route Des Lucioles ; F-06921 Sophia-Antipolis Cedex ; France vol. SA WG2, No. Cabo; Apr. 13, 2015-Apr. 17, 2015 Apr. 7, 2015 (Apr. 7, 2015), XP050962198, Retrieved from the Internet: URL:http://www.3gpp.org/ftp/tsg_sa/WG2_Arc h/TSGS2_108_Los_Cabos/Docs/ [retrieved on Apr. 7, 2015].

* cited by examiner

DYNAMIC SECURITY GATEWAY SELECTION

CROSS-REFERENCE TO RELATED APPLICATION(S)

This application is a Continuation of U.S. patent application Ser. No. 15/887,682, entitled "DYNAMIC EVOLVED PACKET DATA GATEWAY SELECTION" and filed on Feb. 2, 2018, which is a Continuation of U.S. patent application Ser. No. 14/969,612, entitled "DYNAMIC EVOLVED PACKET DATA GATEWAY SELECTION" and filed on Dec. 15, 2015, which claims the benefit of U.S. Provisional Application Ser. No. 62/160,572, entitled "DYNAMIC EVOLVED PACKET DATA GATEWAY (ePDG) SELECTION" and filed on May 12, 2015, the disclosures of each of which are expressly incorporated by reference herein in their entirety.

BACKGROUND

Field

The present disclosure relates generally to communication systems, and more particularly, to gateway selection.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In aspects of the disclosure, a method, an apparatus, and a computer program product for wireless communication are provided. In one aspect, the apparatus connects to a wireless communication network. In another aspect, the apparatus obtains an internet protocol (IP) address from the wireless communication network; determine if a connection to a first public land mobile network (PLMN) has been established. In a further aspect, the apparatus builds a fully qualified domain name (FQDN) based on the determination. In still a further aspect, the apparatus selects a network security gateway based on the FQDN. For example, a list of PLMN-specific FQDNs may include a prioritized list of FQDNs each associated with a specific PLMN. In yet another aspect, when it is determined that the connection to the first PLMN has been established, the apparatus may build the FQDN by retrieving the list of PLMN-specific FQDNs, determining if the first PLMN is found in the list of PLMN-specific FQDNs, and attempting to build the FQDN using each of the prioritized FQDNs in order of priority until the FQDN is built, or retrieving a list comprising a plurality of visited PLMNs (VPLMNs) when the first PLMN is a VPLMN, determining if the first PLMN is found in the list comprising the VPLMNs, and building the FQDN using a PLMN identification (PLMN ID) of the first PLMN if it is determined that the first PLMN is found in the list comprising the VPLMNs. In yet a further aspect, when it is determined that the connection to the first PLMN has not been established, the apparatus builds the FQDN by retrieving the list of PLMN-specific FQDNs, determining if the list of PLMN-specific FQDNs comprises a wildcard PLMN, and building the FQDN based on the wildcard PLMN if it is determined that the list of PLMN-specific FQDNs comprises the wildcard PLMN.

DETAILED DESCRIPTION

Figure 1:
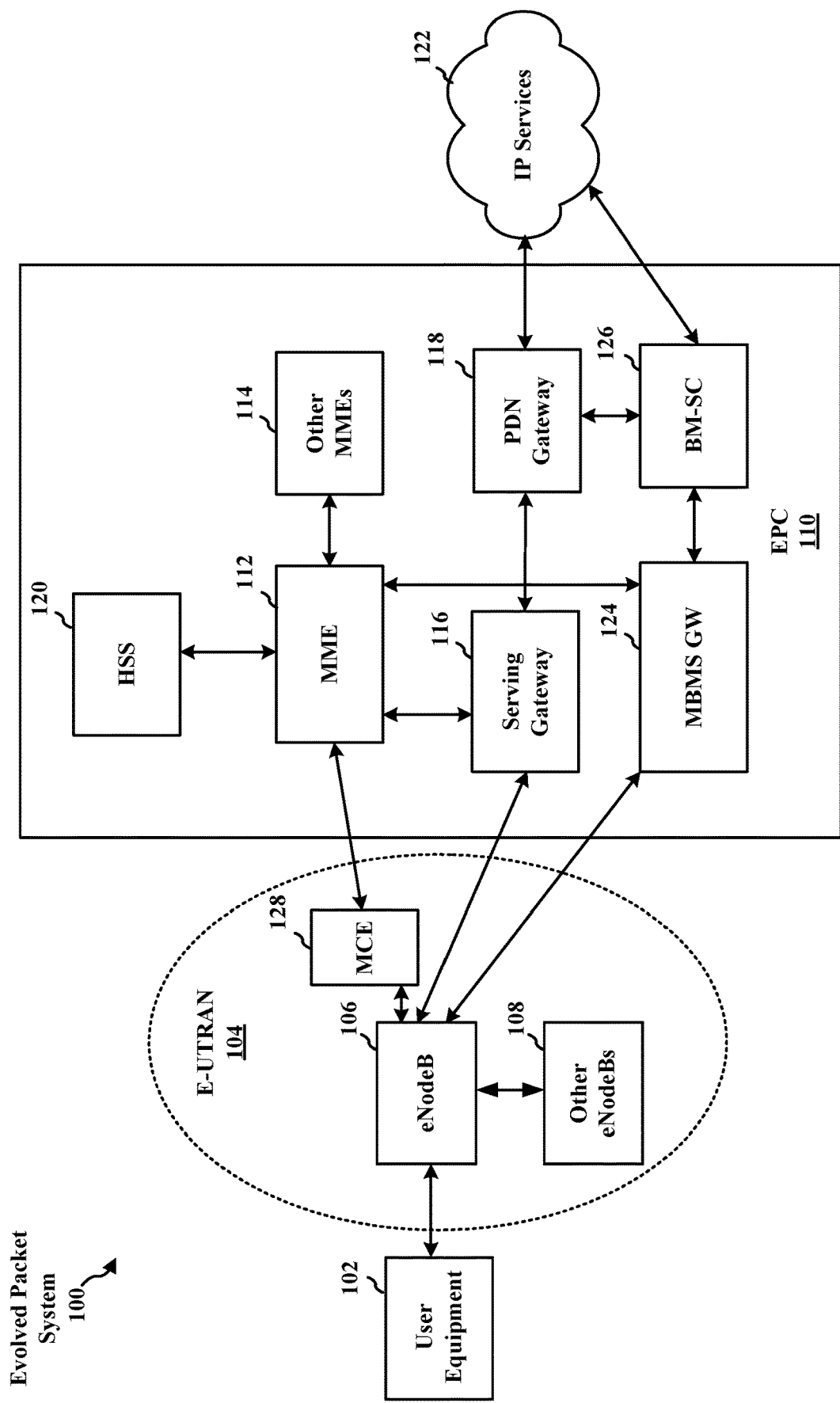
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
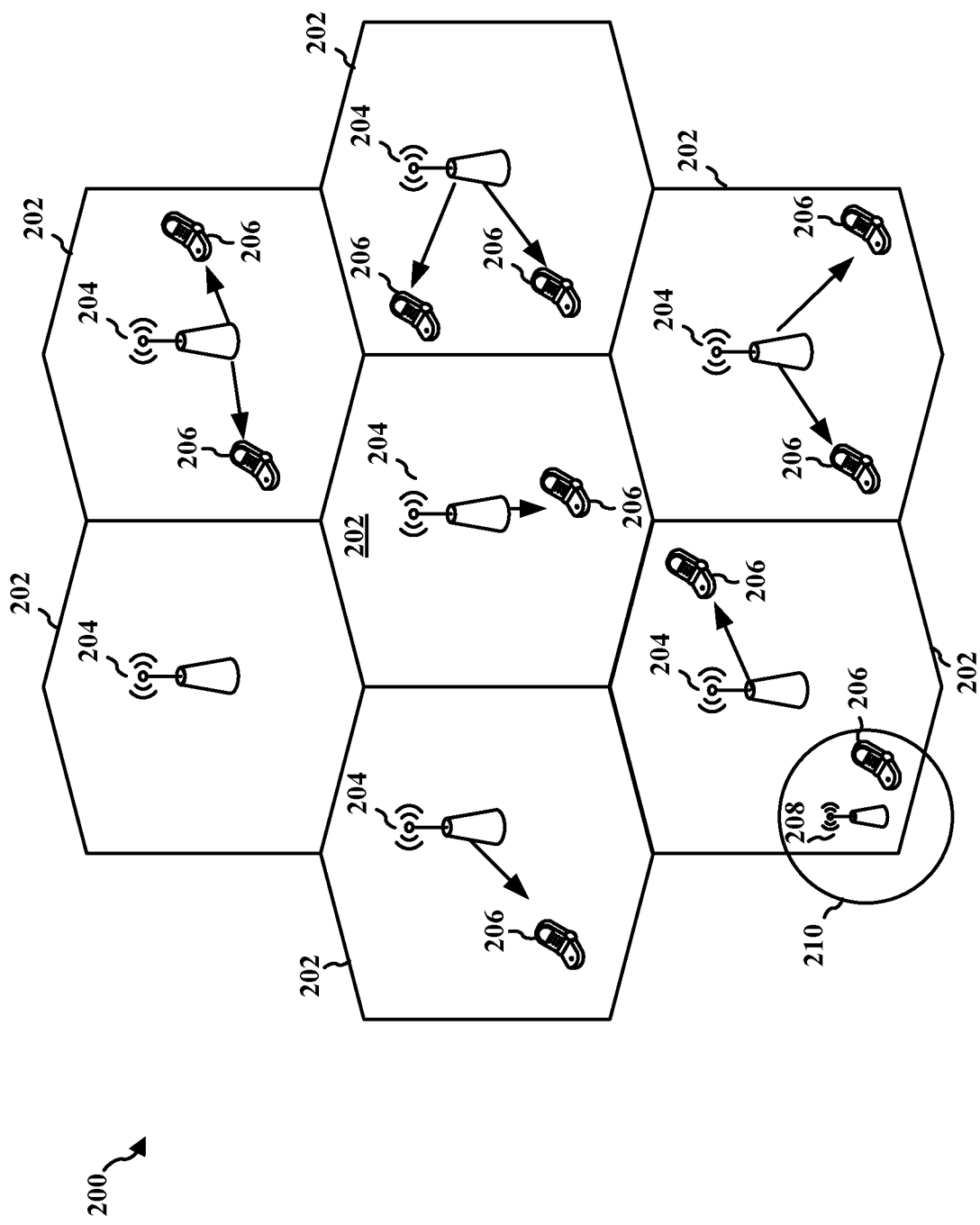
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
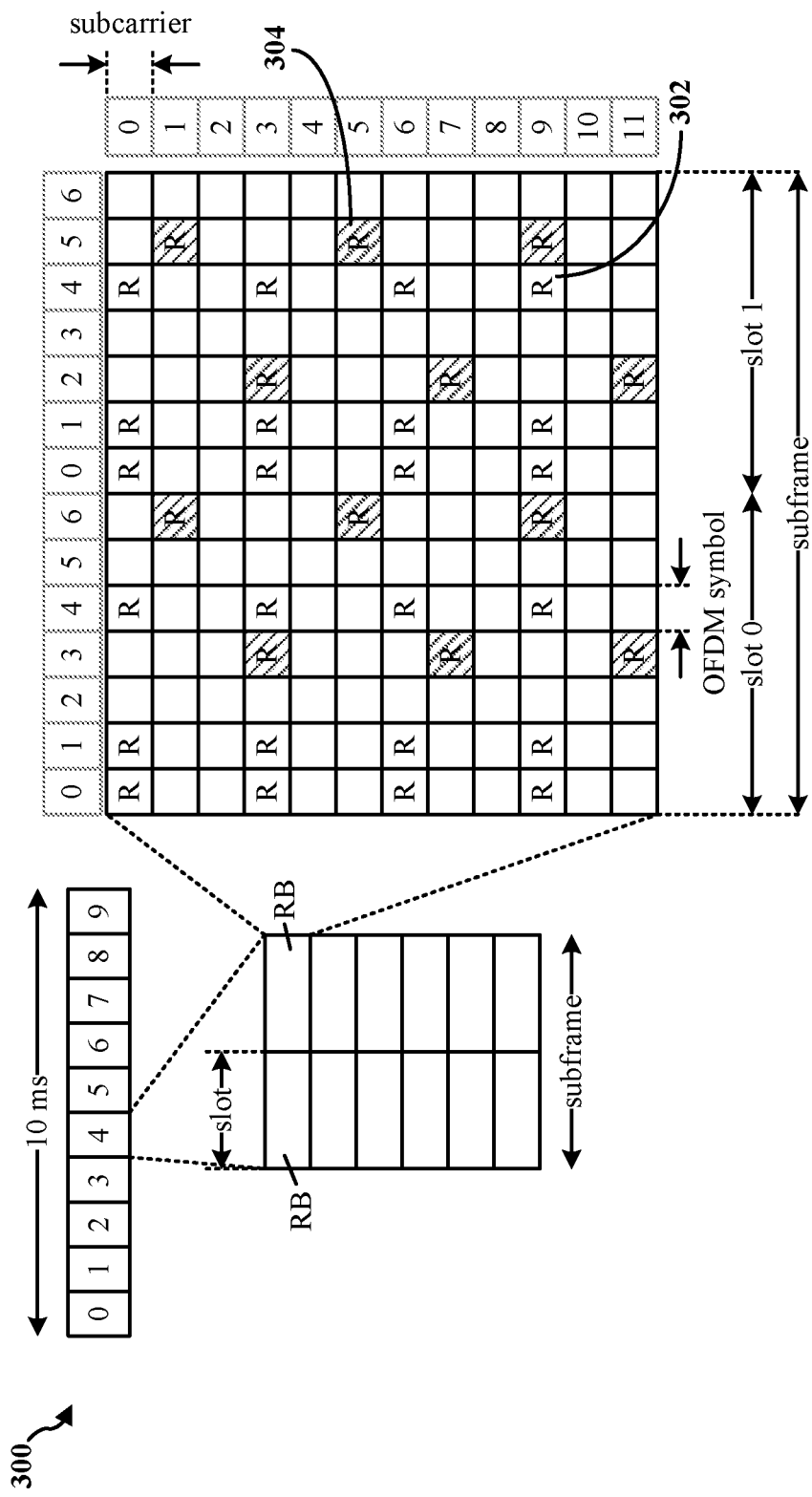
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
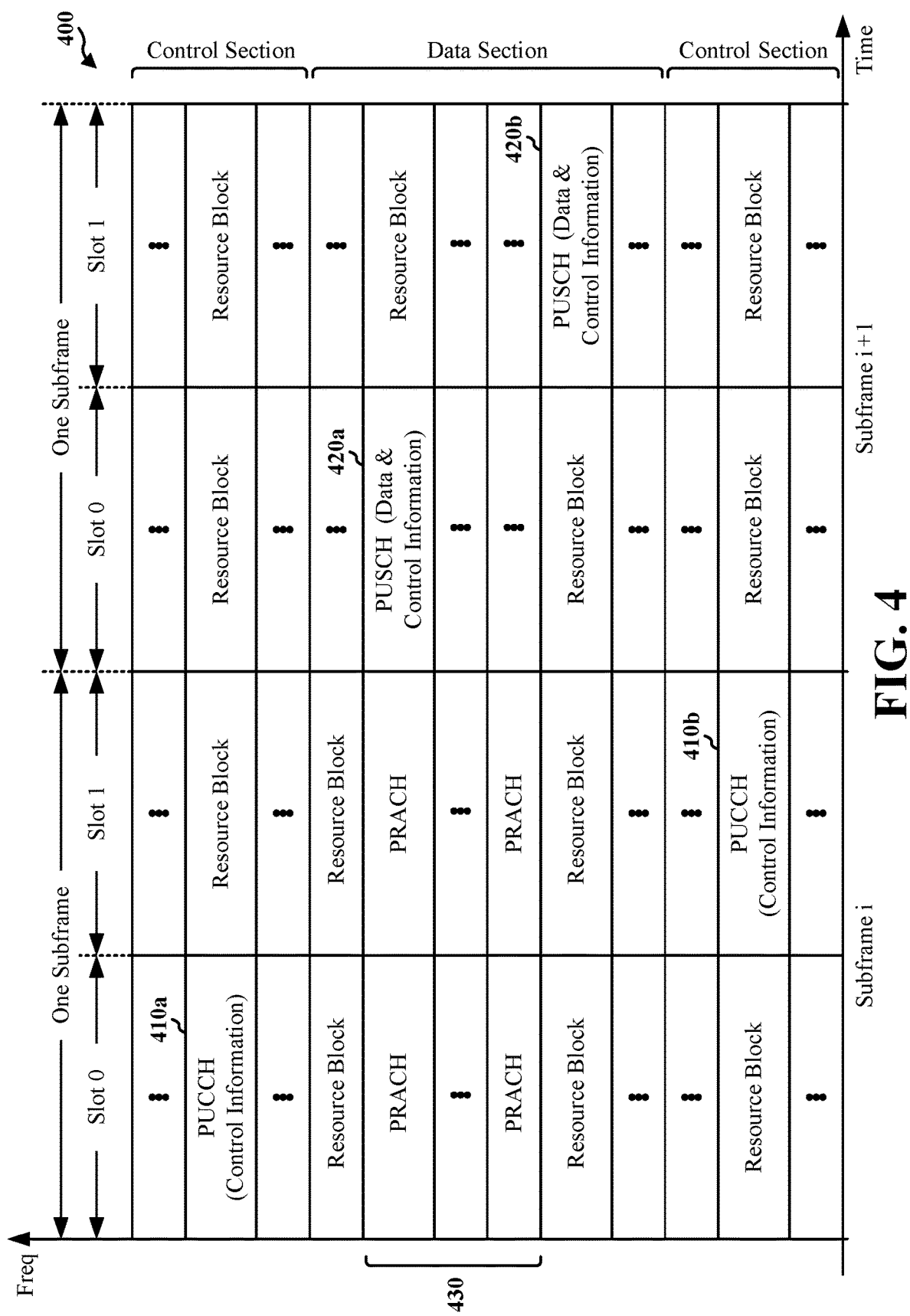
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
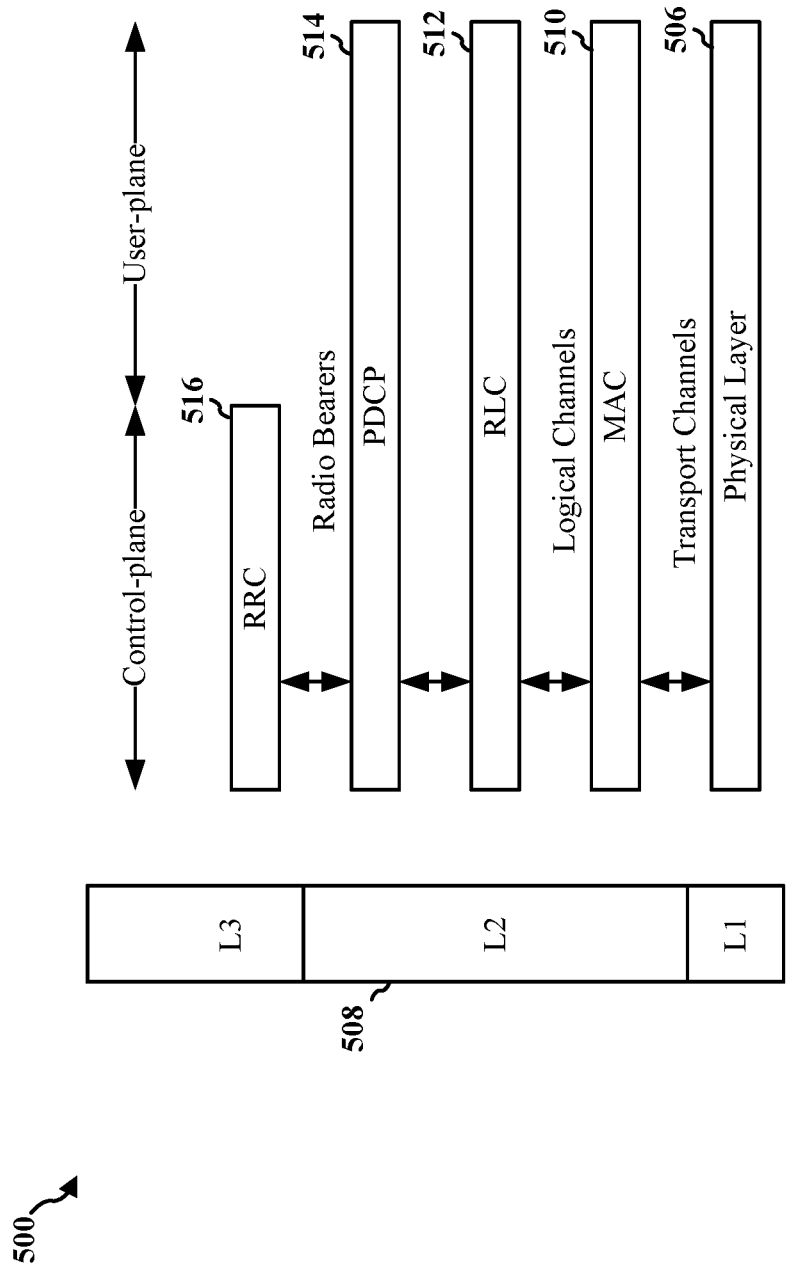
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
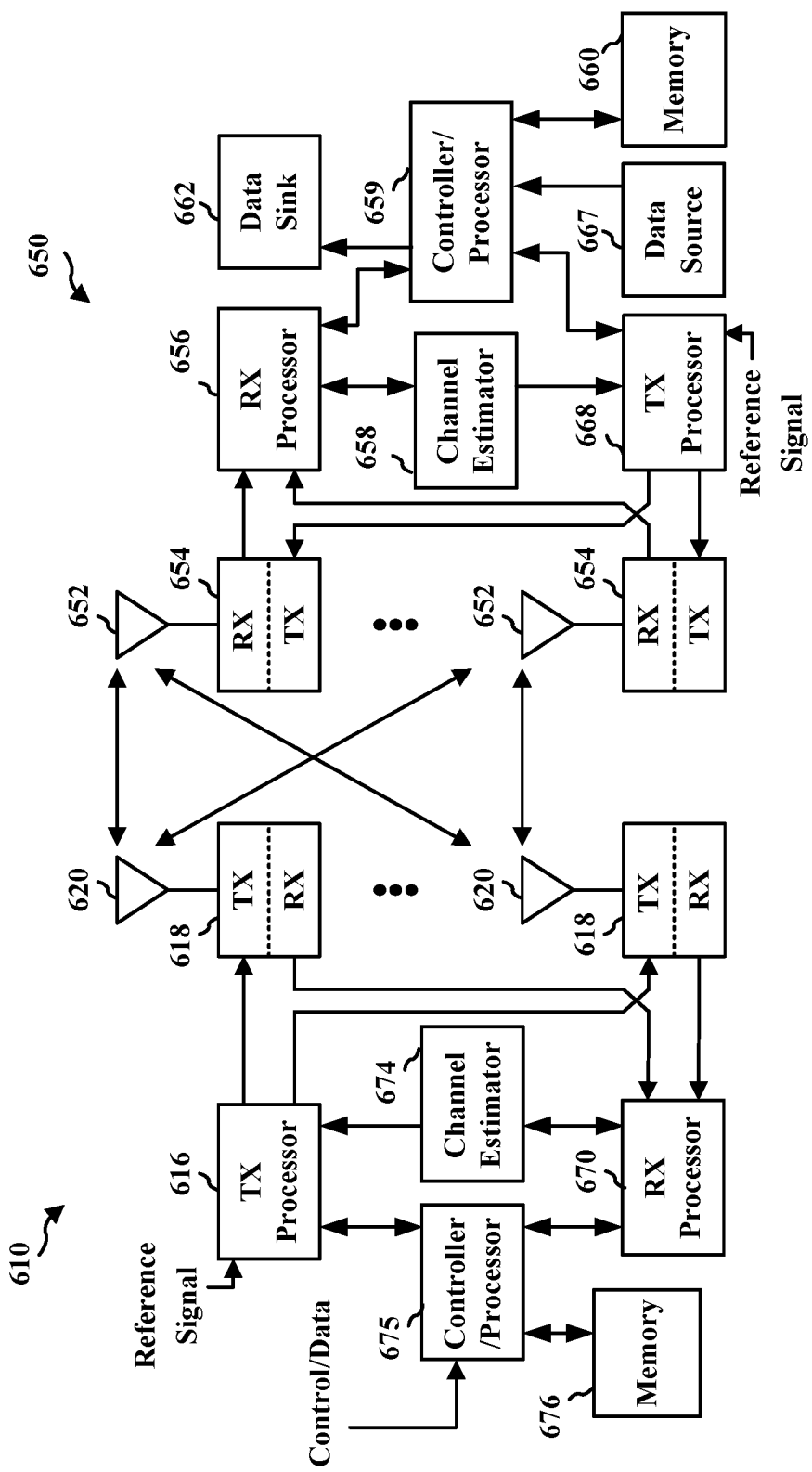
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7A:
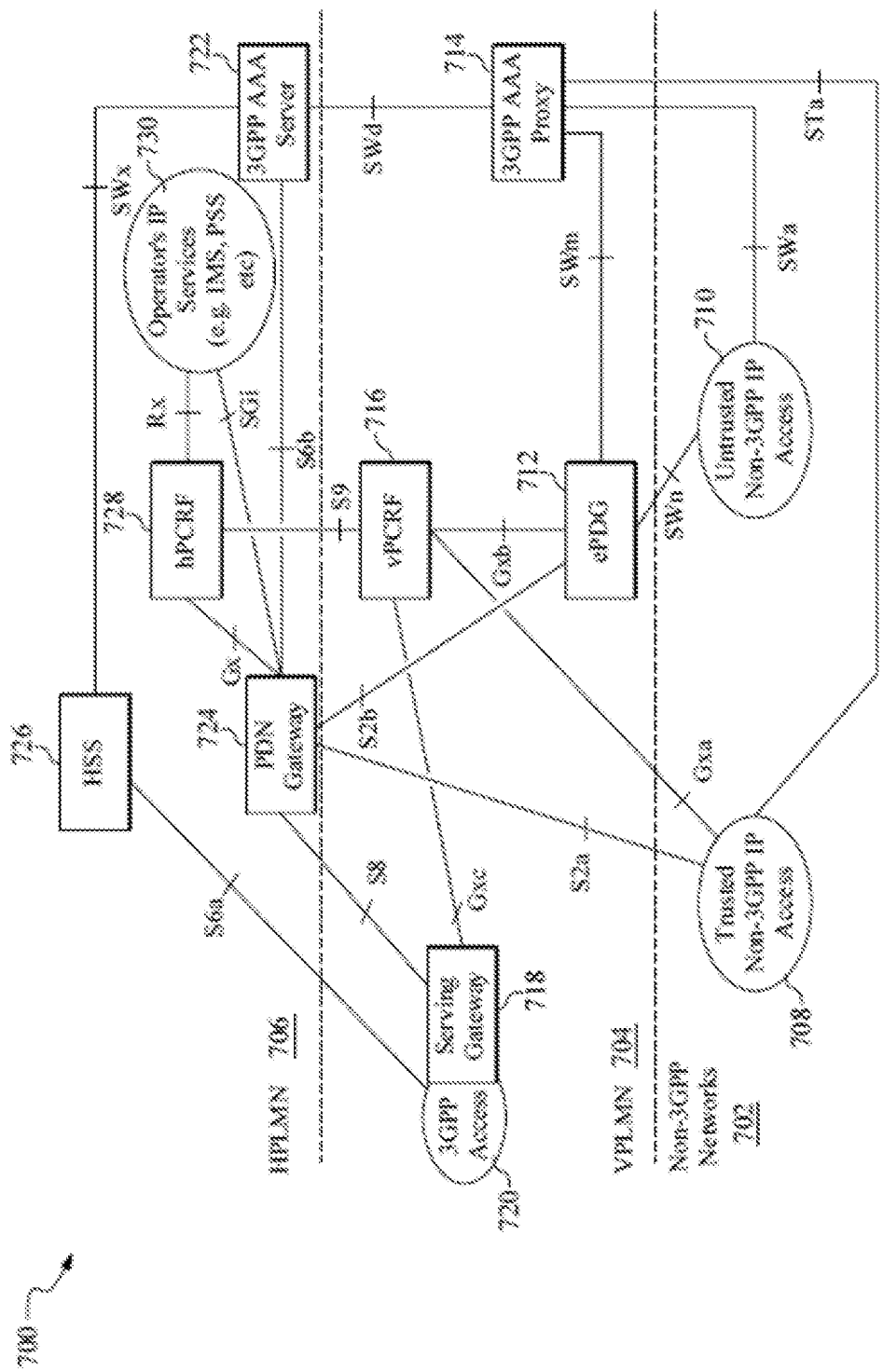
FIG. 7A is a diagram illustrating an example of a roaming architecture for an evolved packet system in which a packet data network (PDN) gateway is located in a home public land mobile network (HPLMN).
Figure 7B:
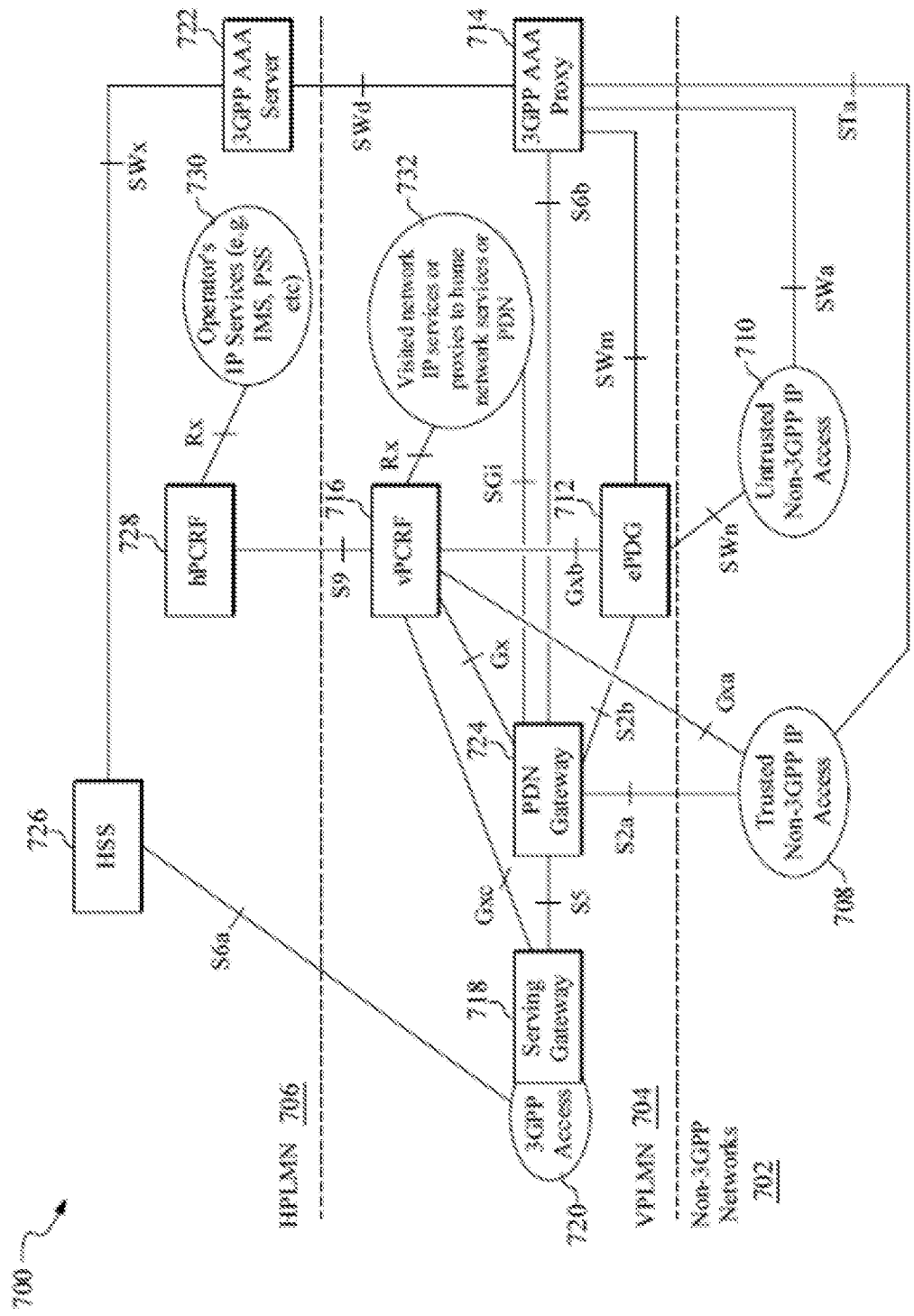
FIG. 7B is a diagram illustrating an example of a roaming architecture for an evolved packet system in which a packet data network (PDN) gateway is located in a visited public land mobile network (VPLMN).

FIG. 7A illustrates roaming architecture for an evolved packet system (EPS) 700 using various interfaces (e.g., S8, S2a, S2b, Gxa, Swn, SWa, STa, SWm, Gxb, S9, S6b, SWx, Rx, Gx, SWd, Gxc, SGi) in which a PDN gateway 724 is located in the home public land mobile network (HPLMN) 706. FIG. 7B illustrates roaming architecture for an EPS 700 using various interfaces (e.g., S5, S2a, S2b, Gxa, SWn, SWa, STA, Gxc, Gx, Gxb, SWm, SGi, Rx, SWd, SWx) in which the PDN gateway 724 is located in a visited public land mobile network (VPLMN) 702.

In an aspect, the evolved packet data gateway (ePDG) 712 be located in the VPLMN 704 and may function as a security gateway to provide network security and internet working control via an IPSec tunnel establishment based on information obtained from the 3GPP AAA (Authentication, Authorization, and Accounting) Proxy 714 via the SWm interface. For example, the ePDG 712 may enable cellular operators to extend wireless coverage, reduce the load on the cellular network, and make use of existing backhaul infrastructure to reduce the cost of carrying cellular calls.

The VPLMN 704 may also include a Serving Gateway 718 that routes and forwards data packets from UEs and act as the mobility anchor during inter-eNB handovers. The Serving Gateway 718 may receive signals from an MME that controls the data traffic. Each UE that enters the EPS 700 may be associated with a Serving Gateway. In addition, the VPLMN 704 may also include a visited Policy and Charging Rules Function (vPCRF) 716 that may determine policy rules in the VPLMN 704. The vPCRF 716 may operate in the network core, access subscriber databases and charging systems, and make policy decisions for UEs in the VPLMN 704.

The HPLMN 706 may include, for example, a Home Subscriber Server (HSS) 726 that acts as the master user database to support the IMS (IP Multimedia Subsystem) of the Operator's IP Services 730. For example, the HSS 726 may contain subscriber profiles, perform subscriber authentication and authorization, and provide information about the subscriber's location and IP information. In addition, the HPLMN 706 may include a 3GPP AAA Server 722 that provides UE authentication via the EAP-AKA (Extensible Authentication Protocol-Authentication and Key Agreement) authentication method. Furthermore, the HPLMN 706 may include a home Policy and Charging Rules Function (hPCRF) 728 that may determine policy rules in the HPLMN 706. The hPCRF 716 may operate in the network core, access subscriber databases and charging systems, and make policy decisions for UEs in the HPLMN 706.

Referring to FIGS. 7A and 7B, when a UE is powered on and if Non-3GPP IP Access Networks 702 are available, the UE may decide, either automatically by the UE or by policies such as the means for buildingaccess network discovery and selection function (ANDSF), to connect to one of the Non-3GPP IP Access Points 708, 710. The Non-3GPP IP Access Points may be a trusted access point 708 or an untrusted access point 710. For example, a trusted Non-3GPP IP Access point 708 can be a Wifi access point that is deployed by a cellular communications operator (e.g., AT&T, Verizon, Sprint, etc.) that allows a UE to connect to the cellular network. Untrusted Non-3GPP IP Access point 710 can be a Wifi access point that is deployed by an entity other the cellular communications operator (e.g., WLAN, local coffee shop, airport, etc.) that allows a UE to connect to the cellular network. When the UE establishes a connection to the untrusted Non-3GPP IP Access point 710, a local IP address can be received by the UE from the access network. The UE may select the ePDG 712 by static configuration or dynamically using the local IP address.

In an aspect, if a selected ePDG 712 is not reachable from an untrusted non-3GPP access point 710, the UE may repeat the ePDG selection and select a different ePDG if available. In addition, if the ePDG 712 needs to be dynamically selected when the UE roams in the VPLMN 704 where a VPLMN ID is known by the UE, the UE can construct a fully qualified domain name (FQDN) using the VPLMN ID as the Operator Identifier and employ the domain name system (DNS) server function to obtain the IP address(es) of the ePDG(s) in the VPLMN. The UE can select an ePDG address from the list returned in the DNS response and initiate the internet protocol security (IPsec) tunnel establishment. A UE connected to one or multiple PDN Gateways may use a single ePDG. In case of handover between ePDGs, the UE may be temporarily connected to two ePDGs.

Additionally and/or alternatively, if the ePDG needs to be dynamically selected the UE can constructs a FQDN using a HPLMN identification (HPLMN ID) and employs the DNS server function to obtain the IP address(es) of the ePDG(s). The UE can select an ePDG address from the list returned in the DNS response and initiates the IPsec tunnel establishment. A UE connected to one or multiple packet data network gateways (PDN GWs) 724 can use a single ePDG 712.

The ePDG FQDN may contain an operator identifier that uniquely identifies the PLMN where the ePDG is located. For example, the ePDG FQDN can be composed of seven labels. The last three labels can be "pub.3gppnetwork.org". The third and fourth labels together can uniquely identify the PLMN. The first two labels shall be "epdg.epc". The result of the ePDG FQDN will be:

"epdg.epc.mnc<MNC>.mcc<MCC>.pub.3gppnetwork.org";

In the roaming case, the UE may utilize the services of the VPLMN. In this case, the ePDG FQDN Operator Identifier can be constructed as described above, but using the mobile network code (MNC) and mobile country code (MCC) of the VPLMN.

In order to guarantee inter-PLMN DNS translation, the <MNC> and <MCC> coding used in the "epdg.epc.mnc<MNC>.mcc<MCC>.pub.3gppnetwork.org" format of the ePDG FQDN Operator Identifier can be <MNC>=3 digits and <MCC>=3 digits.

If there are only 2 significant digits in the MNC, one "0" digit shall be inserted at the left side to fill the 3 digits coding of MNC in the ePDG FQDN.

As an example, the ePDG FQDN Operator Identifier for MCC 345 and MNC 12 is coded in the DNS as "epdg.epc.mnc012.mcc345.pub.3gppnetwork.org".

However, ePDG selection procedures may not define what static configuration is and how it is managed. Moreover, ePDG selection procedures may not address the following scenarios in both the static and dynamic ePDG selection.

For example, cellular network operators may require a specific procedure for selection of the ePDG 712 for S2b connectivity. At present, ePDG static selection and dynamic selection may be based on using the PLMN ID. The current static and dynamic ePDG selection procedures may not support selection procedures where the UE selects an ePDG based on a set of FQDN(s) selected by the HPLMN 706, independently of the PLMN in which the UE is located. In addition, the current static and dynamic ePDG selection procedures may not support selection procedures where the UE selects an ePDG 712 based on the HPLMN ID, independently of the PLMN in which the UE is located. Further, the current static and dynamic ePDG selection procedures may not support selection procedures where the UE selects an ePDG based on a specific set of PLMN-specific FQDN(s) in certain PLMNs and uses the VPLMN ID in other PLMNs. Furthermore, the current static and dynamic ePDG selection procedures may not support selection procedures where the HPLMN 706 is allowed to indicate to the UE in which VPLMN 704 the UE is allowed to select an ePDG 712 (e.g., in order to cater with transitory deployment phases where ePDGs are deployed only by a subset of the roaming partners). The current static and dynamic ePDG selection procedures may not support a selection scenario where the UE is not attached to any PLMN and therefore has not sufficient information to create an FQDN based on the VPLMN ID. Still further, the current static and dynamic ePDG selection procedures may not support scenarios in which the ePDG must be selected in the VPLMN in order to enable legal interception, depending on the local requirements.

Thus, there is a need to allow the UE to select an ePDG based on a set of information configured by the HPLMN, and based on the UE's knowledge of the PLMN it is attached to. For example, there is a need to enable the UE to select, independently of the VPLMN 704 in which the UE is located, an ePDG (not illustrated in FIGS. 7A and 7B) in the HPLMN 706. In addition, there is a need to provide the UE with FQDNs that do not conform to the specified format of the ePDG FQDN (e.g., not based on the specified format including the PLMN ID). Further, there is need to enable a UE to select an ePDG in the HPLMN 706 (e.g., based on the standardized ePDG FQDN) when the UE is in the HPLMN 706 or is in a specific set of VPLMNs 704.

Still further, there is a need to allow the UE to select an ePDG in the HPLMN or the VPLMN based on preconfigured PLMN-specific ePDG FQDNs when the UE is in the HPLMN or a set of VPLMNs (e.g., one of the VPLMNs in the set), whereas for other VPLMNs the UE may select the VPLMN based on the standardized format of the FQDN. In some scenarios, e.g. when the UE is not attached to a cellular access point (e.g., eNB), the UE may not be aware of the PLMN or even the country in which the UE is located. Thus, there is a need to allow the UE to create an FQDN with the PLMN ID of the HPLMN.

Thus, in accordance with an aspect of the present disclosure, the UE may be configured with a prioritized list of PLMN-specific FQDNs, which may include a wildcard PLMN that is applicable to the case where the UE is not attached to any PLMN. For example, the list of PLMN-specific FQDNs may include an ePDG identifiers configuration with the FQDNs or IP addresses of ePDGs in one or more PLMNs (e.g., this may include the HPLMN and VPLMNs). In an aspect, an entry in the ePDG identifiers configuration may include an "any PLMN" value for the PLMN, which matches any PLMN the UE is attached to. If the configuration information contains both an entry with the "any PLMN" value and an entry with the PLMN identity of the PLMN the UE is attached to, the UE may give precedence to the latter. For each PLMN, the list may contain one or more PLMN-specific FQDNs in any format decided by the HPLMN 706 (i.e., may be compliant to the standardized FQDN format or defined by the operator). For example, the home operator can configure the UE to always select an ePDG in the HPLMN by associating the specific FQDN or IP address corresponding to the HPLMN with the "any PLMN" in the list of PLMN-specific FQDNs. The FQDN corresponding to the wildcard PLMN can be used when the UE cannot determine which PLMN the UE is in, e.g., when the UE is not attached to any PLMN either via a cellular access point or any other access point.

In an aspect, the UE may also be configured with a list of VPLMNs for which selection of an ePDG 712 in the VPLMN 706 is preferred. For example, if a VPLMN is in such list, the UE may still be allowed to select an ePDG in the HPLMN should the discovery and selection of an ePDG in the VPLMN fail.

In a further aspect, the configuration of the UE can be based, for example, on pre-configuration or based on ANDSF. In this way, the UE can be provided with a configuration file containing such lists (e.g., one or both lists) or extending the ANDSF managed object to contain such lists.

In still a further aspect, VPLMNs for which ePDG selection in the VPLMN is allowed or preferred may include the VPLMNs for which ePDG selection in the VPLMN is preferred or mandatory (e.g. due to legal interception requirements). For example, the UE may be configured (e.g., by the home operator) to select an ePDG based on FQDN in the HPLMN by providing neither the ePDG identifiers configuration nor the ePDG selection information. In other words, if the UE is in a given VPLMN, the ePDG in the VPLMN can be selected to satisfy the VPLMN regulations. For example, the list can contain such VPLMN to enable the UE to discover and select an ePDG in such VPLMN. Additionally and/or alternatively, the home operator can configure the UE to always attempt first to select an ePDG in the VPLMN by either not providing the ePDG identifiers configuration or by providing the ePDG identifiers only for the HPLMN, and/or by providing the ePDG selection information containing the "any PLMN" value for the PLMN and the indication of "preferred".

In an aspect, the UE can perform the ePDG selection according to the following algorithm:

If the UE is attached via 3GPP to one of the PLMNs for which the UE has been provided a PLMN-specific FQDN or the IP address for the PLMN in the ePDG identifiers, then the UE shall use the corresponding FQDN from the list of PLMN-specific FQDNs to obtain the IP address(es) of the ePDG(s) in the PLMN, or the UE shall use the corresponding configured IP address; and If the UE is attached via 3GPP access to a VPLMN and the VPLMN is in a list of VPLMNs configured by the HPLMN (e.g. via pre-configuration or ANDSF) as preferred for ePDG selection, the UE shall select the ePDG of the VPLMN by building the FQDN using the PLMN ID, if the UE is not attached to any PLMN, and the UE has been configured with an FQDN associated to a wildcard PLMN (e.g., UE has been configured with an FQDN or IP address associated to a "any PLMN" value for the PLMN identity in the ePDG identifiers configuration), then the UE shall use such FQDN (e.g., to obtain the IP address(es) of the ePDGs in the PLMN or the corresponding configured IP address), in all other cases, the UE shall select the ePDG of the HPLMN by building the FQDN using the PLMN ID.

In an aspect, the home operator can configure the UE to select an ePDG in the HPLMN corresponding to a specific FQDN by associating the specific FQDN corresponding to the HPLMN with the wildcard PLMN in the list of PLMN-specific FQDNs, by providing only such entry in the list of PLMN-specific FQDNs, and by not providing the list of VPLMNs for which selection of an ePDG in the VPLMN is allowed.

In an aspect, the home operator can configure the UE to select an ePDG in the HPLMN and build the FQDN for such ePDG with the PLMN ID by providing neither the list of PLMN-specific FQDNs nor the list of VPLMNs for which selection of an ePDG in the VPLMN is allowed. For example, the home operator can configure the UE to select an ePDG based on FQDN in the HPLMN by providing neither the ePDG identifiers configuration nor the ePDG selection information.

Various solutions of the present disclosure describe a method in which a UE performs ePDG selection based on a series of information by using the FQDN of the ePDG for ePDG discovery.

In an aspect, the set of information may include the current PLMN in which the UE is attached or is located. In such case, the UE can create an FQDN with the PLMN ID of the HPLMN.

In a further aspect, the set of information may include a prioritized list of PLMN-specific FQDNs and the information on the current PLMN in which the UE is attached to or is located. In such case, if the current PLMN is in the list, the UE can retrieve the corresponding FQDN(s) and attempt to build the FQDN with the first one PLMN ID in the list, then the second PLMN ID in the list, etc. Otherwise the UE can build the FQDN with the PLMN ID of the HPLMN.

In a further aspect, the set of information may include a prioritized list of PLMN-specific FQDNs. Here, the UE may not know the current PLMN in which it is located. In such case, if the list contains a wildcard PLMN, the UE can use the FQDN corresponding to the wildcard PLMN to build the FQDN. Otherwise the UE may build the FQDN with the PLMN ID of the HPLMN.

Moreover, the set of information may include a list of VPLMNs for which selection of an ePDG in the VPLMN is preferred and the information on the current PLMN in which the UE is attached or is located. In such case, if the current PLMN is in the list, the UE can build the FQDN with the PLMN ID of the current PLMN. Otherwise, the UE can build the FQDN with the PLMN ID of the HPLMN.

Additionally, the set of information may include a list of VPLMNs for which selection of an ePDG in the VPLMN is preferred and the UE does not know the current PLMN. In such case, the UE can create an FQDN with the PLMN ID of the HPLMN.

Figure 8:
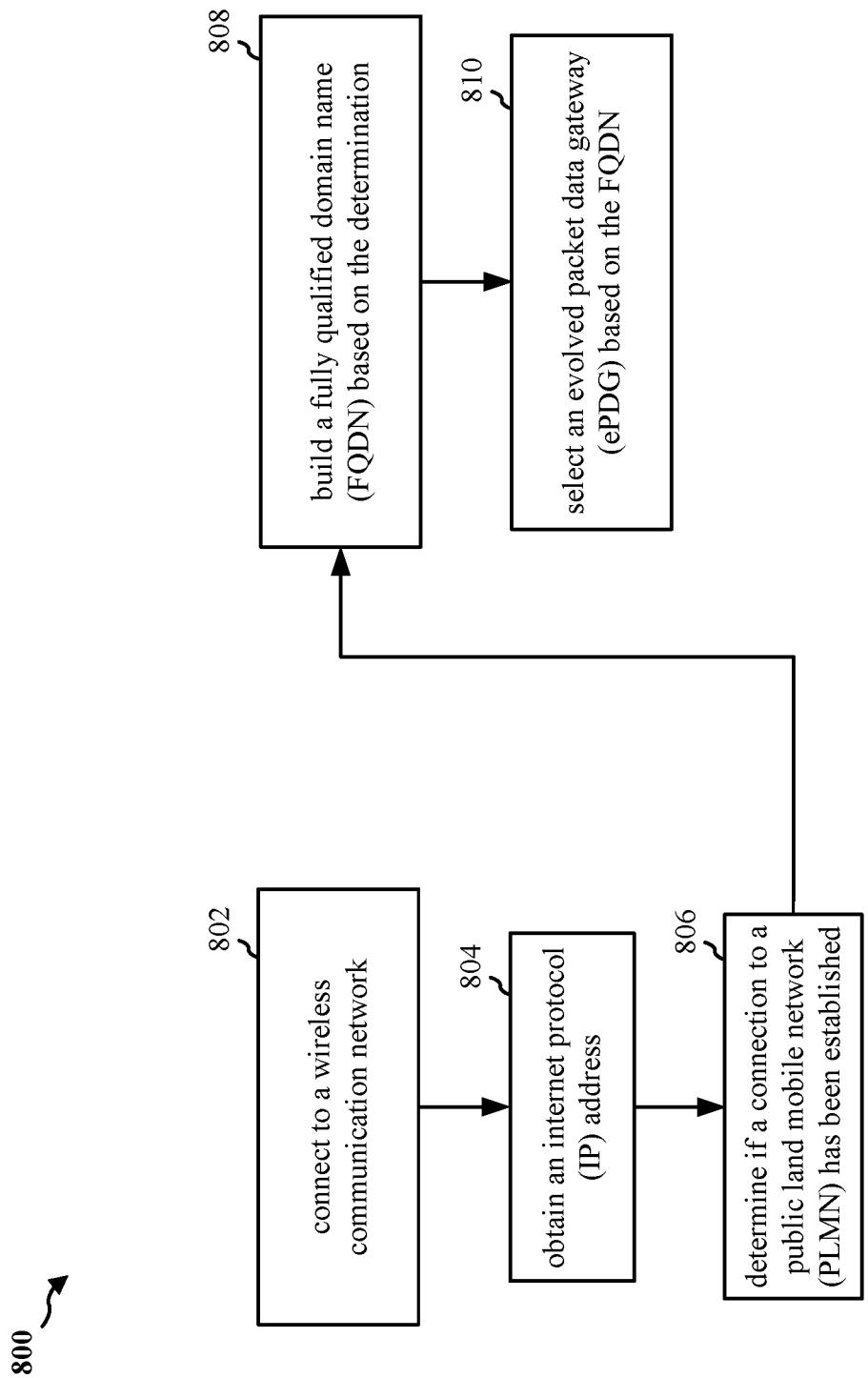
FIG. 8 is a flowchart of a method of wireless communication.

FIG. 8 is a flowchart 800 of a method of wireless communication. The method may be performed by a UE (e.g., UE 102).

In block 802, the UE can connect to a wireless communication network. For example, the UE can connect to the wireless communication network using an untrusted Non-3GPP IP access point.

In block 804, the UE can obtain an IP address from the wireless communication network.

In block 806, the UE can determine if a connection to a public land mobile network (PLMN) through cellular network has been established. For example, the UE may determine that a connection to a cellular network has been established and may know the PLMN in which the UE is located. Alternatively, the UE may determine that no connection to a cellular network has been established, and thus will not know the PLMN in which the UE is located.

In block 808, the UE can build a fully qualified domain name (FQDN) based on the determination.

In an aspect, when the UE determines that the connection to the PLMN has been established, the UE can build the FQDN using a PLMN ID of a HPLMN.

In an aspect, when the UE determines that the connection to the PLMN has been established, the UE can build the FQDN by retrieving a list of PLMN-specific FQDNs, wherein the list comprises a prioritized list of FQDNs associated with a specific PLMN, determining if the current PLMN is found in the list, and attempting to build the FQDN using each of the prioritized FQDNs in order of priority until the FQDN is built.

In an aspect, if the attempting to build the FQDN using the each of the prioritized FQDNs fails, the UE can build the FQDN using a PLMN ID of a home PLMN (HPLMN).

In an aspect, when the UE determines that the connection to the PLMN has not been established, the UE can build the FQDN by retrieving a list of PLMN-specific FQDNs, wherein the list comprises a prioritized list of FQDNs associated with a specific PLMN, determining if the list comprises a wildcard PLMN, and building the FQDN based on the wildcard PLMN if it is determined that the list comprises the wildcard PLMN. In an aspect, when the UE determines that the list does not comprise the wildcard PLMN, the UE can build the FQDN using a PLMN ID of a HPLMN. Optionally, the UE can include its location information that it is aware of in the DNS query message to the network. For example, by including the location information to the DNS query sent to the network, the network (e.g., DNS server), upon receiving the DNS request with the FQDN constructed using the HPLMN ID along with the UE location information may assign a local ePDG that is close to the UE location. This may allow the UE to use a local ePDG while the UE is roaming to a foreign country but is not attached to any cellular network.

In an aspect, when the UE determines that the connection to the PLMN has been established, the UE can build the FQDN by retrieving a list comprising information related to a VPLMNs, determining if the PLMN is found in the list, and building the FQDN using a PLMN ID of the PLMN if it is determined that the PLMN is found in the list. In an aspect, when the UE determines that the PLMN is not found in the list, the UE can build the FQDN using a PLMN ID of a HPLMN.

In an aspect, when the UE determines that the connection to the PLMN has not been established, the UE can build the FQDN using a PLMN ID of a HPLMN. Optionally, the UE can include its location information that it is aware of in the DNS query message to the network.

At step 810, the UE can select an ePDG based on the FQDN.

Figure 9:
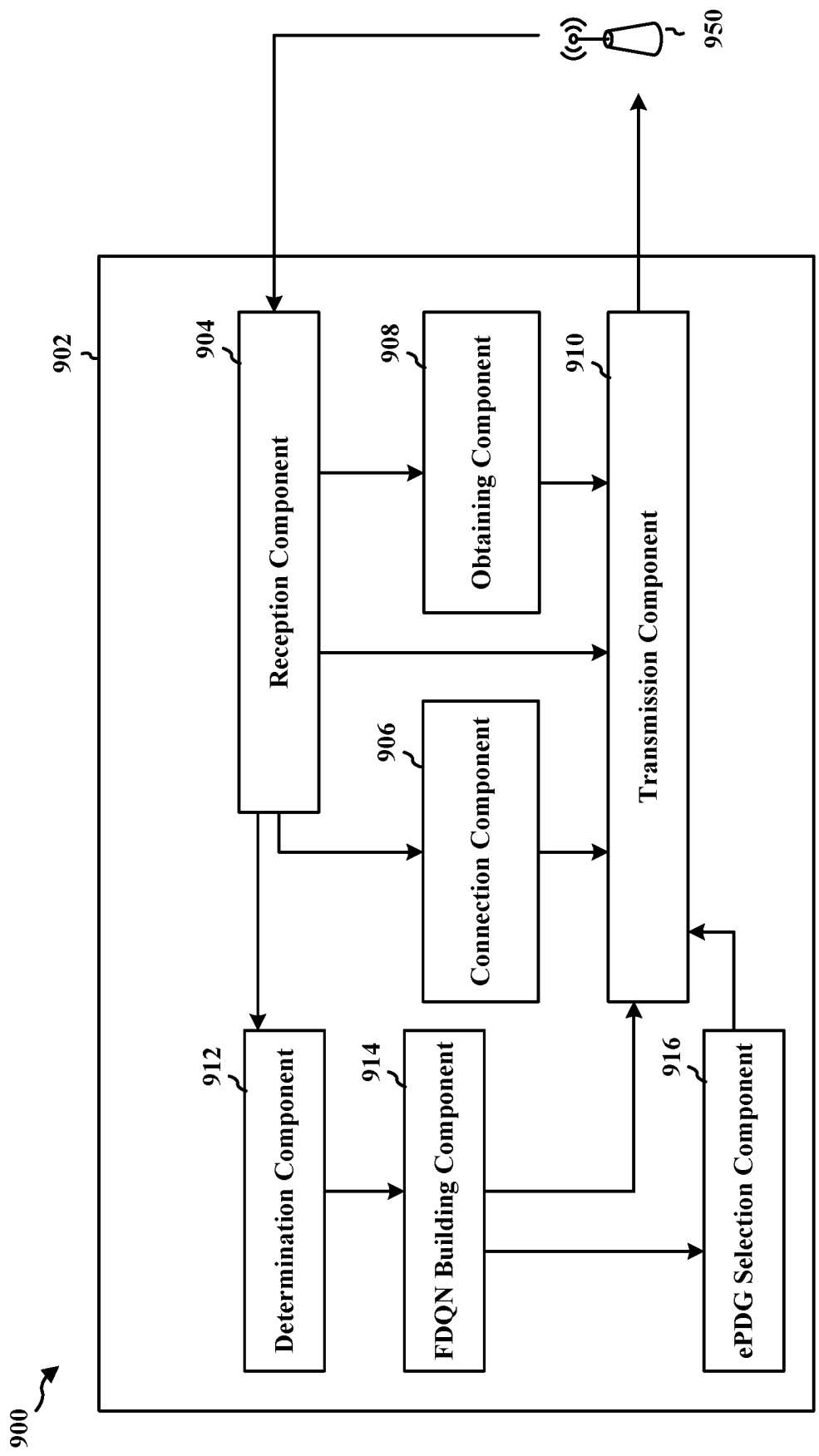
FIG. 9 is a conceptual data flow diagram illustrating the data flow between different means/components in an exemplary apparatus.

FIG. 9 is a conceptual data flow diagram 900 illustrating the data flow between different means/components in an exemplary apparatus 902. The apparatus may be a UE. The apparatus includes a reception component 904 that receives information from access point 950 (e.g., an access point to a wireless communications network), a connection component 906, an obtaining component 908, a transmission component 910 that transmits information to the access point 950, a determination component 912, an FDQN building component, and an ePDG selection component.

In an aspect, the connection component 906 can to connect to a wireless communication network. For example, the UE can connect to the wireless communication network using an untrusted Non-3GPP IP access.

In another aspect, the obtaining component 908 can obtain an IP address from the wireless communication network.

In a further aspect, the determination component 912 can determine if a connection to a PLMN has been established. For example, the UE may determine that a connection to a cellular network has been established and may know the PLMN in which the UE is located. Alternatively, the UE may determine that no connection to a cellular network has been established, and thus will not know the PLMN in which the UE is located.

In another aspect, the FDQN building component 914 can build a FQDN based on the determination. For example, when the determination component 912 determines that the connection to the PLMN has been established a signal can be sent to the FDQN building component 914, and the FDQN building component 914 can build the FQDN using a PLMN ID of a HPLMN. In a further aspect, when the determination component 912 determines that the connection to the PLMN has been established, the FDQN building component 914 can build the FQDN by retrieving a list of PLMN-specific FQDNs. For example, the list may include a prioritized list of FQDNs associated with a specific PLMN, determining if the current PLMN is found in the list, and attempting to build the FQDN using each of the prioritized FQDNs in order of priority until the FQDN is built. Moreover, in another aspect, if the attempting to build the FQDN using the each of the prioritized FQDNs fails, the FDQN building component 914 can build the FQDN using a PLMN ID of a HPLMN. Furthermore, when the determination component 912 determines that the connection to the PLMN has not been established, the FDQN building component 914 can build the FQDN by retrieving a list of PLMN-specific FQDNs. For example, the list may a prioritized list of FQDNs associated with a specific PLMN, determining if the list comprises a wildcard PLMN, and the FDQN building component 914 can build the FQDN based on the wildcard PLMN if it is determined that the list comprises the wildcard PLMN. In yet a further aspect, when the determination component 912 determines that the list does not comprise the wildcard PLMN, the FDQN building component 914 can build the FQDN using a PLMN ID of a HPLMN. Moreover, when the determination component 912 determines that the connection to the PLMN has been established, the FDQN building component 914 can build the FQDN by retrieving a list comprising information related to a plurality of VPLMNs, the determination component can determine if the PLMN is found in the list, and the FDQN building component 914 can build the FQDN using a PLMN ID of the current PLMN if it is determined that the PLMN is found in the list. In an aspect, when the determination component 912 determines that the PLMN is not found in the list, the FDQN building component 914 can build the FQDN using a PLMN ID of a HPLMN. In still a further aspect, when the determination component 912 determines that the connection to the PLMN has not been established, the FDQN building component 914 can build the FQDN using a PLMN ID of a HPLMN.

In yet a further aspect, the ePDG selection component 916 can select an ePDG based on the FQDN built by the FQDN building component 914.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
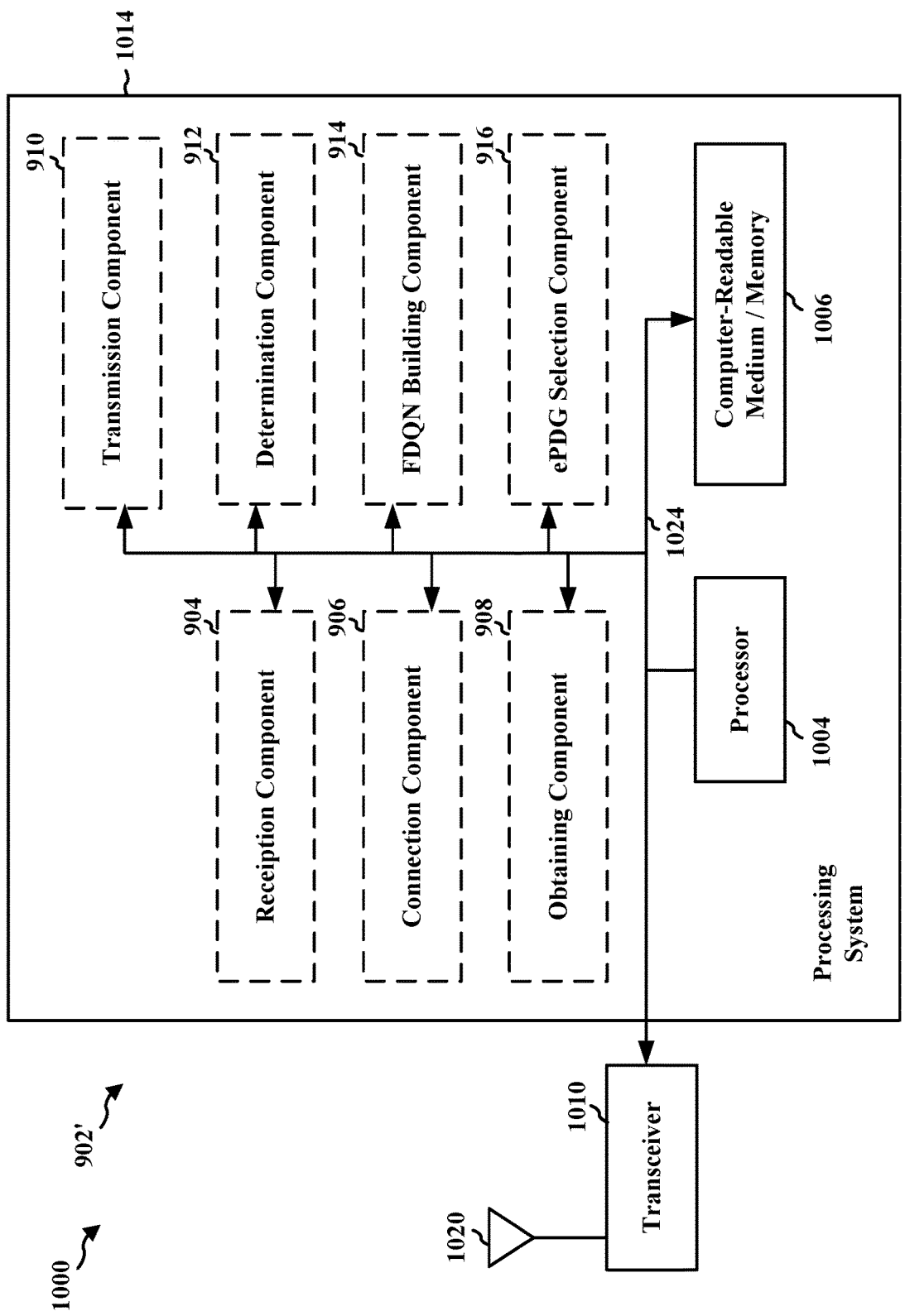
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, and 916 and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 910, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, and 916. The components may be software components running in the processor 1004, resident/stored in the computer readable medium/memory 1006, one or more hardware components coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means for means for connecting to a wireless communication network. In addition, the apparatus 902/902' for wireless communication includes means for obtaining an internet protocol (IP) address from the wireless communication network. Further, the apparatus 902/902' for wireless communication includes means for determining if a connection to a public land mobile network (PLMN) has been established. Moreover, the apparatus 902/902' for wireless communication includes means for building a fully qualified domain name (FQDN) based on the determination. In an aspect, when the means for determining determines that the connection to the PLMN has been established, the means for building the FQDN is configured to retrieve a list of PLMN-specific FQDNs, wherein the list comprises a prioritized list of FQDNs each associated with a specific PLMN, determine if the PLMN is found in the list, and attempt to build the FQDN using each of the prioritized FQDNs in order of priority until the FQDN is built or retrieve a list comprising a plurality of VPLMNs when the PLMN is a VPLMN, determine if the PLMN is found in the list, and build the FQDN using a PLMN ID of the PLMN if it is determined that the PLMN is found in the list. In another aspect, when the means for determining determines that the connection to the PLMN has not been established, the means for building the FQDN is further configured to retrieve the list of PLMN-specific FQDNs, wherein the list comprises a prioritized list of FQDNs each associated with a specific PLMN, determine if the list comprises a wildcard PLMN, and build the FQDN based on the wildcard PLMN if it is determined that the list comprises the wildcard PLMN. In yet another aspect, when the means for determining determines that the connection to the PLMN has been established and that the PLMN is not found in the list of PLMN-specific FQDNs, the means for building the FQDN is further configured to build the FQDN using the PLMN ID of a HPLMN. Moreover, when the means for building fails to build the FQDN using each of the prioritized FQDNs, the means for building the FQDN is further configured to build the FQDN using the PLMN ID of a HPLMN. Still further, when the means for determining determines that the list of PLMN-specific FQDNs does not comprise the wildcard PLMN, the means for building the FQDN is further configured to build the FQDN using the PLMN ID of a HPLMN. Further still, when the means for determining determines that the PLMN is not found in the list comprising the plurality of VPLMNs, the means for building the FQDN is further configured to build the FQDN using the PLMN ID of a HPLMN. Additionally, the apparatus 902/902' for wireless communication includes means for selecting an ePDG based on the FQDN.

The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a user equipment, the method comprising:
    connecting to a wireless communication network;
    obtaining an internet protocol (IP) address from the wireless communication network;
    determining that a connection to a first public land mobile network (PLMN) has been established;
    building a fully qualified domain name (FQDN) based on a determination that the connection to the first PLMN has been established and a set of information configured by the user equipment's home public land mobile network (HPLMN), the set of information configured by the user equipment's HPLMN comprising a list of public land mobile networks (PLMNs), the building of the FQDN comprising:
  building the FQDN using a PLMN identification (PLMN ID) of the first PLMN when the connection to the first PLMN has been established and the first PLMN is in the list of PLMNs configured by the user equipment's HPLMN; and
  selecting a network security gateway based on the FQDN.

2. The method of claim 1, wherein building the FQDN using the PLMN ID of the first PLMN when the connection to the first PLMN has been established and the first PLMN is in the list of PLMNs configured by the user equipment's HPLMN comprises:
  determining if the first PLMN is in the list of PLMNs configured by the user equipment's HPLMN; and
  in response to determining that the connection to the first PLMN has been established and determining that the first PLMN is in the list of PLMNs configured by the user equipment's HPLMN, building the FQDN using the PLMN ID of the first PLMN.

3. The method of claim 1, wherein the list of PLMNs configured by the user equipment's HPLMN comprises a list of visited public land mobile networks (VPLMNs).

4. The method of claim 1, wherein the list of PLMNs configured by the user equipment's HPLMN comprises a list of visited public land mobile networks (VPLMNs) configured by the user equipment's HPLMN; and
  wherein building the FQDN using the PLMN ID of the first PLMN when the connection to the first PLMN has been established and the first PLMN is in the list of PLMNs configured by the user equipment's HPLMN comprises:
    determining if the first PLMN is in the list of VPLMNs configured by the user equipment's HPLMN; and
    in response to determining that the connection to the first PLMN has been established and determining that the first PLMN is in the list of VPLMNs configured by the user equipment's HPLMN, building the FQDN using the PLMN ID of the first PLMN.

5. The method of claim 1, further comprising:
  by the one or more processors of the user equipment:
    receiving, from the user equipment's HPLMN, the list of PLMNs configured by the user equipment's HPLMN.

6. The method of claim 1, further comprising:
  by the one or more processors of the user equipment:
    receiving, via an access network discovery and selection function (ANDSF), the list of PLMNs configured by the user equipment's HPLMN.

7. An apparatus for wireless communication, the apparatus comprising:
  means for connecting to a wireless communication network;
  means for obtaining an internet protocol (IP) address from the wireless communication network;
  means for determining that a connection to a first public land mobile network (PLMN) has been established;
  means for building a fully qualified domain name (FQDN) based on a determination that the connection to the first PLMN has been established and a set of information configured by the user equipment's home public land mobile network (HPLMN), the set of information configured by the user equipment's HPLMN comprising a list of public land mobile networks (PLMNs), the means for building the FQDN being configured to:
    build the FQDN using a PLMN identification (PLMN ID) of the first PLMN when the connection to the first PLMN has been established and the first PLMN is in the list of PLMNs configured by the user equipment's HPLMN; and
  means for selecting a network security gateway based on the FQDN.

8. The apparatus of claim 7, wherein the means for building the FQDN using the PLMN ID of the first PLMN when the connection to the first PLMN has been established and the first PLMN is in the list of PLMNs configured by the user equipment's HPLMN is configured to:
  determine if the first PLMN is in the list of PLMNs configured by the user equipment's HPLMN; and
  in response to determining that the connection to the first PLMN has been established and determining that the first PLMN is in the list of PLMNs configured by the user equipment's HPLMN, build the FQDN using the PLMN ID of the first PLMN.

9. The apparatus of claim 7, wherein the list of PLMNs configured by the user equipment's HPLMN comprises a list of visited public land mobile networks (VPLMNs).

10. The apparatus of claim 7, wherein the list of PLMNs configured by the user equipment's HPLMN comprises a list of visited public land mobile networks (VPLMNs) configured by the user equipment's HPLMN; and
  wherein the means for building the FQDN using the PLMN ID of the first PLMN when the connection to the first PLMN has been established and the first PLMN is in the list of PLMNs configured by the user equipment's HPLMN is configured to:
    determine if the first PLMN is in the list of VPLMNs configured by the user equipment's HPLMN; and
    in response to determining that the connection to the first PLMN has been established and determining that the first PLMN is in the list of VPLMNs configured by the user equipment's HPLMN, build the FQDN using the PLMN ID of the first PLMN.

11. The apparatus of claim 7, further comprising:
  means for receiving, from the user equipment's HPLMN, the list of PLMNs configured by the user equipment's HPLMN.

12. The apparatus of claim 7, further comprising:
  means for receiving, via an access network discovery and selection function (ANDSF), the list of PLMNs configured by the user equipment's HPLMN.

13. An apparatus for wireless communication, the apparatus comprising:
  a memory; and
  at least one processor coupled to the memory and configured to:
    connect to a wireless communication network;
    obtain an internet protocol (IP) address from the wireless communication network;
    determine that a connection to a first public land mobile network (PLMN) has been established;
    build a fully qualified domain name (FQDN) based on a determination that the connection to the first PLMN has been established and a set of information configured by a user equipment's home public land mobile network (HPLMN), the set of information configured by the user equipment's HPLMN comprising a list of public land mobile networks (PLMNs), the building of the FQDN comprising:

building the FQDN using a PLMN identification (PLMN ID) of the first PLMN when the connection to the first PLMN has been established and the first PLMN is in the list of PLMNs configured by the user equipment's HPLMN; and select a network security gateway based on the FQDN.

14. The apparatus of claim 13, wherein building the FQDN using the PLMN ID of the first PLMN when the connection to the first PLMN has been established and the first PLMN is in the list of PLMNs configured by the user equipment's HPLMN comprises:

determining if the first PLMN is in the list of PLMNs configured by the user equipment's HPLMN; and in response to determining that the connection to the first PLMN has been established and determining that the first PLMN is in the list of PLMNs configured by the user equipment's HPLMN, building the FQDN using the PLMN ID of the first PLMN.

15. The apparatus of claim 13, wherein the list of PLMNs configured by the user equipment's HPLMN comprises a list of visited public land mobile networks (VPLMNs).

16. The apparatus of claim 13, wherein the list of PLMNs configured by the user equipment's HPLMN comprises a list of visited public land mobile networks (VPLMNs) configured by the user equipment's HPLMN; and wherein building the FQDN using the PLMN ID of the first PLMN when the connection to the first PLMN has been established and the first PLMN is in the list of PLMNs configured by the user equipment's HPLMN comprises:

determining if the first PLMN is in the list of VPLMNs configured by the user equipment's HPLMN; and in response to determining that the connection to the first PLMN has been established and determining that the first PLMN is in the list of VPLMNs configured by the user equipment's HPLMN, building the FQDN using the PLMN ID of the first PLMN.

17. The apparatus of claim 13, wherein the at least one processor is further configured to:

receive, from the user equipment's HPLMN, the list of PLMNs configured by the user equipment's HPLMN.

18. The apparatus of claim 13, wherein the at least one processor is further configured to:

receive, via an access network discovery and selection function (ANDSF), the list of PLMNs configured by the user equipment's HPLMN.

19. A non-transitory computer-readable medium storing computer executable code for wireless communication, comprising code for:

connecting to a wireless communication network;

obtaining an internet protocol (IP) address from the wireless communication network;

determining that a connection to a first public land mobile network (PLMN) has been established;

building a fully qualified domain name (FQDN) based on a determination that the connection to the first PLMN has been established and a set of information configured by a user equipment's home public land mobile network (HPLMN), the set of information configured by the user equipment's HPLMN comprising a list of public land mobile networks (PLMNs), the building of the FQDN comprising:

building the FQDN using a PLMN identification (PLMN ID) of the first PLMN when the connection to the first PLMN has been established and the first PLMN is in the list of PLMNs configured by the user equipment's HPLMN; and selecting a network security gateway based on the FQDN.

20. The non-transitory computer-readable medium of claim 19, wherein building the FQDN using the PLMN ID of the first PLMN when the connection to the first PLMN has been established and the first PLMN is in the list of PLMNs configured by the user equipment's HPLMN comprises:

determining if the first PLMN is in the list of PLMNs configured by the user equipment's HPLMN; and in response to determining that the connection to the first PLMN has been established and determining that the first PLMN is in the list of PLMNs configured by the user equipment's HPLMN, building the FQDN using the PLMN ID of the first PLMN.

21. The non-transitory computer-readable medium of claim 19, wherein the list of PLMNs configured by the user equipment's HPLMN comprises a list of visited public land mobile networks (VPLMNs).

22. The non-transitory computer-readable medium of claim 19, wherein the list of PLMNs configured by the user equipment's HPLMN comprises a list of visited public land mobile networks (VPLMNs) configured by the user equipment's HPLMN; and wherein building the FQDN using the PLMN ID of the first PLMN when the connection to the first PLMN has been established and the first PLMN is in the list of PLMNs configured by the user equipment's HPLMN comprises:

determining if the first PLMN is in the list of VPLMNs configured by the user equipment's HPLMN; and in response to determining that the connection to the first PLMN has been established and determining that the first PLMN is in the list of VPLMNs configured by the user equipment's HPLMN, building the FQDN using the PLMN ID of the first PLMN.

23. The non-transitory computer-readable medium of claim 19, wherein the non-transitory computer-readable medium further comprises code for:

receiving, from the user equipment's HPLMN, the list of PLMNs configured by the user equipment's HPLMN.

24. The non-transitory computer-readable medium of claim 19, wherein the non-transitory computer-readable medium further comprises code for:

receiving, via an access network discovery and selection function (ANDSF), the list of PLMNs configured by the user equipment's HPLMN.

25. A method of wireless communication, the method comprising:

by one or more processors of a home public land mobile network (HPLMN) of a user equipment:

sending a set of information to the user equipment, the set of information configured by the HPLMN and comprising a list of public land mobile networks (PLMNs), the user equipment being configured to:

connect to a wireless communication network;

obtain an internet protocol (IP) address from the wireless communication network;

determine that a connection to a first public land mobile network (PLMN) has been established;

build a fully qualified domain name (FQDN) based on a determination that the connection to the first PLMN has been established and the set of information configured by the HPLMN comprising the list of PLMNs, the building of the FQDN comprising:

building the FQDN using a PLMN identification (PLMN ID) of the first PLMN when the connection to the first PLMN has been established and the first PLMN is in the list of PLMNs configured by the HPLMN; and select a network security gateway based on the FQDN.

26. An apparatus for wireless communication, the apparatus comprising:

means for sending a set of information to a user equipment, the set of information configured by the user equipment's home public land mobile network (HPLMN) and comprising a list of public land mobile networks (PLMNs), the user equipment being configured to:

connect to a wireless communication network;

obtain an internet protocol (IP) address from the wireless communication network;

determine that a connection to a first public land mobile network (PLMN) has been established;

build a fully qualified domain name (FQDN) based on a determination that the connection to the first PLMN has been established and the set of information configured by the user equipment's HPLMN comprising the list of PLMNs, the building of the FQDN comprising:

building the FQDN using a PLMN identification (PLMN ID) of the first PLMN when the connection to the first PLMN has been established and the first PLMN is in the list of PLMNs configured by the user equipment's HPLMN; and select a network security gateway based on the FQDN.

27. An apparatus for wireless communication, the apparatus comprising:

a memory; and at least one processor coupled to the memory and configured to:

sending a set of information to a user equipment, the set of information configured by the user equipment's home public land mobile network (HPLMN) and comprising a list of public land mobile networks (PLMNs), the user equipment being configured to:

connect to a wireless communication network;

obtain an internet protocol (IP) address from the wireless communication network;

determine that a connection to a first public land mobile network (PLMN) has been established;

build a fully qualified domain name (FQDN) based on a determination that the connection to the first PLMN has been established and the set of information configured by the user equipment's HPLMN comprising the list of PLMNs, the building of the FQDN comprising:

building the FQDN using a PLMN identification (PLMN ID) of the first PLMN when the connection to the first PLMN has been established and the first PLMN is in the list of PLMNs configured by the HPLMN configured by the user equipment's HPLMN; and select a network security gateway based on the FQDN.

28. A non-transitory computer-readable medium storing computer executable code for wireless communication, comprising code for:

sending a set of information to a user equipment, the set of information configured by the user equipment's home public land mobile network (HPLMN) and comprising a list of public land mobile networks (PLMNs), the user equipment being configured to:

connect to a wireless communication network;

obtain an internet protocol (IP) address from the wireless communication network;

determine that a connection to a first public land mobile network (PLMN) has been established;

build a fully qualified domain name (FQDN) based on a determination that the connection to the first PLMN has been established and the set of information configured by the user equipment's HPLMN comprising the list of PLMNs, the building of the FQDN comprising:

building the FQDN using a PLMN identification (PLMN ID) of the first PLMN when the connection to the first PLMN has been established and the first PLMN is in the list of PLMNs configured by the HPLMN configured by the user equipment's HPLMN; and select a network security gateway based on the FQDN.

29. The method of claim 1, wherein the network security gateway comprises an Evolved Packet Data Gateway (EPDG).

30. The apparatus of claim 7, wherein the network security gateway comprises an Evolved Packet Data Gateway (EPDG).

31. The apparatus of claim 13, wherein the network security gateway comprises an Evolved Packet Data Gateway (EPDG).

32. The method of claim 25, wherein the network security gateway comprises an Evolved Packet Data Gateway (EPDG).

33. The apparatus of claim 26, wherein the network security gateway comprises an Evolved Packet Data Gateway (EPDG).

34. The apparatus of claim 27, wherein the network security gateway comprises an Evolved Packet Data Gateway (EPDG).

* * * * *